United States Patent
Shen et al.

(10) Patent No.: US 9,369,900 B2
(45) Date of Patent: Jun. 14, 2016

(54) SELECTING A COMMUNICATION CHANNEL BASED ON A NEIGHBORING CELL CONSTRAINT

(71) Applicant: QUALCOMM Incorporated, San Diego, CA (US)

(72) Inventors: Cong Shen, San Diego, CA (US); Tao Chen, San Diego, CA (US); Farhad Meshkati, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/483,547

(22) Filed: Sep. 11, 2014

(65) Prior Publication Data
US 2015/0072697 A1    Mar. 12, 2015

Related U.S. Application Data

(60) Provisional application No. 61/933,680, filed on Jan. 30, 2014, provisional application No. 61/918,741, filed on Dec. 20, 2013, provisional application No. 61/877,164, filed on Sep. 12, 2013.

(51) Int. Cl.
*H04W 72/08* (2009.01)
*H04W 24/08* (2009.01)
(Continued)

(52) U.S. Cl.
CPC .............. *H04W 24/08* (2013.01); *H04W 16/10* (2013.01); *H04W 24/02* (2013.01); *H04W 72/08* (2013.01)

(58) Field of Classification Search
CPC . H04W 72/085; H04W 72/06; H04W 72/082; H04W 36/30

USPC ................... 455/434, 435.2, 450, 452.2, 455
See application file for complete search history.

(56) References Cited

U.S. PATENT DOCUMENTS 6,185,423 B1 * 2/2001 Brown et al. .................. 455/434
6,453,166 B1   9/2002 Ishikawa et al.
(Continued)

FOREIGN PATENT DOCUMENTS

EP         1248478 A1    10/2002
EP         1617600 A1    1/2006
(Continued)

OTHER PUBLICATIONS

International Search Report and Written Opinion—PCT/US2014/055302—ISA/EPO—Jan. 7, 2015.

*Primary Examiner* — Kevin Kim
(74) *Attorney, Agent, or Firm* — Muncy, Geissler, Olds & Lowe, P.C.

(57) ABSTRACT

Provided are methods and apparatus for selecting a channel to use for communicating. The methods and apparatus select a channel having the least interference and minimize a number of different channels in use. For example, a provided method includes calculating a utility value for each channel in a plurality of channels by weighting, based on a number of the neighborhood small cells (NSC) using each channel in the plurality of channels, both a respective modified non-NSC received signal strength indication (RSSI) and a respective modified reference signal received power (RSRP). The non-NSC RSSI is calculated by subtracting a respective RSRP from a total RSSI. The respective modified RSRP for each channel in the plurality of channels is calculated by applying the respective RSRP to a cumulative distribution function. The channel having the highest or the lowest utility value is chosen as the channel to use for the communicating.

20 Claims, 8 Drawing Sheets

(51) Int. Cl.
*H04W 24/02* (2009.01)
*H04W 16/10* (2009.01)

(56) References Cited

U.S. PATENT DOCUMENTS

| | | | |
|---|---|---|---|
| 8,447,317 | B2 | 5/2013 | Li et al. |
| 8,676,216 | B2 | 3/2014 | Zhou et al. |
| 2003/0013455 | A1 | 1/2003 | Shoji et al. |
| 2006/0013179 | A1 | 1/2006 | Yamane |
| 2007/0115877 | A1 | 5/2007 | Zhen et al. |
| 2010/0177710 | A1 | 7/2010 | Gutkin et al. |
| 2010/0240407 | A1 | 9/2010 | Park et al. |
| 2011/0134844 | A1 | 6/2011 | Hosono |
| 2011/0294527 | A1 | 12/2011 | Brueck et al. |
| 2012/0058728 | A1 | 3/2012 | Wang et al. |
| 2012/0238279 | A1 | 9/2012 | Yu et al. |
| 2013/0035128 | A1 | 2/2013 | Chan et al. |
| 2013/0079003 | A1 | 3/2013 | Nagaraja et al. |
| 2013/0157680 | A1 | 6/2013 | Morita et al. |
| 2013/0235746 | A1 | 9/2013 | Patel et al. |
| 2014/0056250 | A1 | 2/2014 | Cattoni et al. |
| 2015/0071104 | A1 | 3/2015 | Shen et al. |
| 2015/0072697 | A1 | 3/2015 | Shen et al. |
| 2015/0195845 | A1 | 7/2015 | Wang et al. |

FOREIGN PATENT DOCUMENTS

| | | |
|---|---|---|
| EP | 2282565 A1 | 2/2011 |
| WO | 2013163181 A1 | 10/2013 |

* cited by examiner

SELECTING A COMMUNICATION CHANNEL BASED ON A NEIGHBORING CELL CONSTRAINT

CROSS-REFERENCE TO RELATED APPLICATIONS

The present Application for Patent claims priority to United States Provisional Patent Application No. 61/877,164 entitled "AUTONOMOUS CELL CHANNEL SELECTION METHOD AND APPARATUS WITH CO-CHANNEL OPERATION CONSTRAINT" filed Sep. 12, 2013; U.S. Provisional Patent Application No. 61/918,741 entitled "AUTONOMOUS CELL CHANNEL SELECTION METHOD AND APPARATUS WITH CO-CHANNEL OPERATION CONSTRAINT" filed Dec. 20, 2013; and U.S. Provisional Patent Application No. 61/933,680 entitled "USER EQUIPMENT-ASSISTED CHANNEL SELECTION METHOD AND APPARATUS WITH CO-CHANNEL OPERATION CONSTRAINT" filed Jan. 30, 2014, each of which is assigned to the assignee hereof and hereby expressly incorporated by reference herein.

REFERENCE TO CO-PENDING APPLICATIONS FOR PATENT

The present Application for Patent is also related to the following co-pending U.S. Patent Application: "AUTONOMOUSLY SELECTING A COMMUNICATION CHANNEL HAVING A CO-CHANNEL OPERATION CONSTRAINT," having Ser. No. 14/483,500, filed concurrently herewith, assigned to the assignee hereof, and expressly incorporated herein by reference in its entirety.

INTRODUCTION

This disclosure relates generally to electronics, and more specifically, but not exclusively, to a method and apparatus for autonomously selecting a communication channel having a co-channel constraint.

Wireless communication systems are widely deployed to provide various types of communication content, such as voice, data, and so on. Typical wireless communication systems are multiple-access systems capable of supporting communication with multiple users by sharing available system resources (e.g., bandwidth, transmit power, etc.). Examples of such multiple-access systems include code division multiple access (CDMA) systems, time division multiple access (TDMA) systems, frequency division multiple access (FDMA) systems, orthogonal frequency division multiple access (OFDMA) systems, and others. These systems are often deployed in conformity with specifications such as third generation partnership project (3GPP), 3GPP long term evolution (LTE), ultra mobile broadband (UMB), evolution data optimized (EV-DO), and the like.

In cellular networks, macro scale access points (or macro NodeBs (MNBs)) provide connectivity and coverage to a large number of users over a certain geographical area. A macro network deployment is carefully planned, designed, and implemented to offer good coverage over the geographical region. Even such careful planning, however, cannot fully accommodate channel characteristics such as fading, multipath, shadowing, etc., especially in indoor environments. Indoor users therefore often face coverage issues (e.g., call outages and quality degradation) resulting in a poor experience by the users.

To extend cellular coverage indoors, such as for residential homes and office buildings, additional small coverage, typically low-power access points have recently begun to be deployed to supplement conventional macro networks, providing more robust wireless coverage for mobile devices. These small coverage access points are commonly referred to as neighborhood small cells (NSCs), Home NodeBs or Home eNBs (collectively, H(e)NBs), femto nodes, femtocells, femtocell access points, pico nodes, micro nodes, etc., and are deployed for incremental capacity growth, richer user experience, in-building or other specific geographic coverage, and so on. Such small coverage access points can be connected to the Internet and the mobile network operator's network, for example, via a digital subscriber line (DSL) router, a cable modem, and/or a fiber optic line.

Operators of access points must assign channels to access devices that are permitted to associate with a respective access point. Conventionally, neighboring access points do not coordinate channel assignments. For example, consider a mobile network operator who has N total channels for the operator's access points (e.g., access points (femto, pico, micro, etc.)) from which to select for a specific service. The operator also has other services that can occupy some or all of these same channels at different geographical locations. Hence, a dynamic channel selection method and apparatus are needed. There is a need for a dynamic channel selection method and apparatus that selects a channel having the least interference (e.g., interference emanating from non-LTE sources such as WiFi sources, etc.), such that the access points have the best performance in terms of coverage and capacity, as well as that has as many access points operating on the same channel as possible (i.e., to minimize a percentage of access points that operate on channels that are different than the majority). This would improve mobility management over conventional techniques, as intra-frequency measurement is much less costly than inter-frequency measurement.

Accordingly, there are long-felt industry needs for methods and apparatus that improve upon conventional methods and apparatus, including the improved methods and apparatus provided hereby.

SUMMARY

This summary provides a basic understanding of some aspects of the present teachings. This summary is not exhaustive in detail, and is neither intended to identify all critical features, nor intended to limit the scope of the claims.

The word "exemplary" is used herein to mean "serving as an example, instance, or illustration." Any aspect described herein as "exemplary" is not necessarily to be construed as preferred or advantageous over other aspects disclosed.

Exemplary methods and apparatus for selecting a channel to use for communicating are provided. An exemplary method includes retrieving, for each channel in a plurality of channels, a respective stored user equipment report for the channel, where the respective stored user equipment report includes data describing a detected neighborhood small cell (NSC) that is operating on the channel and a respective reference signal received power (RSRP) from the detected NSC; computing, for each channel in the plurality of channels, a non-NSC related received signal strength indication (RSSI) by subtracting the respective RSRP from a total received signal strength indication; computing a modified non-NSC RSSI by applying the non-NSC RSSI to a cumulative distribution function; computing, for each channel in the plurality of channels, a respective modified RSRP by applying the respective RSRP for each channel to a cumulative distribution function; calculating, using a processor, a utility value for each channel in the plurality of channels by weighting, based on a number of the NSCs using each respective channel in the plurality of channels, both the respective modified non-NSC RSSI for each channel and the respective modified RSRP for each channel; and choosing the channel having the highest utility value or the lowest utility value as the channel to use for the communicating. The data about the detected NSC that is operating on the channel can further include data describing a median of multiple measurements of the RSRP for the at least one channel in the plurality of channels. The calculating the utility value can use the following equation to determine the utility value ($U_n$) for a channel (n) in the plurality of channels:

$$U_n = -(M_n - K_n * \Delta)$$

where:
$M_n$ = the respective modified non-NSC RSSI and the respective modified RSRP for the channel,
$K_n$ = the number of neighboring access points using the channel, and
$\Delta$ = an amount to bias the transmission characteristic measurement for each neighboring access point using the channel.

In an example, the processor can be part of an access point, and the choosing can be performed during boot-up of the access point. The method can include using a default channel prior to completing the choosing.

In a further example, provided is a non-transitory computer-readable medium, having at least one instruction stored thereon that, if executed by a processor, such as a special-purpose processor, cause the processor to execute at least a part of the aforementioned method. The non-transitory computer-readable medium can be integrated with a device, such as a mobile device, a music player, a video player, an entertainment unit, a navigation device, a communications device, a personal digital assistant, a fixed location data unit, and/or a computer.

In another example, provided is an apparatus configured to select a communication channel to use. The apparatus includes means for retrieving, for each channel in a plurality of channels, a respective stored user equipment report for the channel, where the respective stored user equipment report includes data describing a detected neighborhood small cell (NSC) that is operating on the channel and a respective reference signal received power (RSRP) from the detected NSC; means for computing, for each channel in the plurality of channels, a non-NSC related received signal strength indication (RSSI) by subtracting the respective RSRP from a total received signal strength indication; means for computing a modified non-NSC RSSI by applying the non-NSC RSSI to a cumulative distribution function; means for computing, for each channel in the plurality of channels, a respective modified RSRP by applying the respective RSRP for each channel to a cumulative distribution function; means for calculating, using a processor, a utility value for each channel in the plurality of channels by weighting, based on a number of the NSCs using each respective channel in the plurality of channels, both the respective modified non-NSC RSSI for each channel and the respective modified RSRP for each channel; and means for choosing the channel having the highest utility value or the lowest utility value as the channel to use for the communicating. The data about the detected NSC that is operating on the channel can further include data describing a median of multiple measurements of the RSRP for the at least one channel in the plurality of channels. The means for calculating the utility value can use the following equation to determine the utility value ($U_n$) for a channel (n) in the plurality of channels:

$$U_n = -(M_n - K_n * \Delta)$$

where:
$M_n$ = the respective modified non-NSC RSSI and the respective modified RSRP for the channel,
$K_n$ = the number of neighboring access points using the channel, and
$\Delta$ = an amount to bias the transmission characteristic measurement for each neighboring access point using the channel.

In another example, the means for choosing is part of an access point, and the means for choosing is configured to perform the choosing during boot-up of the access point. The apparatus can further include means for using a default channel prior to completing the choosing.

At least a part of the apparatus can be integrated in a semiconductor die. Further, at least a part of the apparatus can be a part of a device, such as a mobile device, a set top box, a music player, a video player, an entertainment unit, a navigation device, a communications device, a personal digital assistant, a fixed location data unit, and/or a computer. In a further example, provided is a non-transitory computer-readable medium, having at least one instruction stored thereon that, if executed by a lithographic device, cause the lithographic device to fabricate at least a part of the apparatus.

In another example, provided is an apparatus configured to select a communication channel to use. The apparatus includes a processor configured to: retrieve, for each channel in a plurality of channels, a respective stored user equipment report for the channel, where the respective stored user equipment report includes data describing a detected neighborhood small cell (NSC) that is operating on the channel and a respective reference signal received power (RSRP) from the detected NSC; compute, for each channel in the plurality of channels, a non-NSC related received signal strength indication (RSSI) by subtracting the respective RSRP from a total received signal strength indication; compute a modified non-NSC RSSI by applying the non-NSC RSSI to a cumulative distribution function; compute, for each channel in the plurality of channels, a respective modified RSRP by applying the respective RSRP for each channel to a cumulative distribution function; calculate, using a processor, a utility value for each channel in the plurality of channels by weighting, based on a number of the NSCs using each respective channel in the plurality of channels, both the respective modified non-NSC RSSI for each channel and the respective modified RSRP for each channel; and choose the channel having the highest utility value or the lowest utility value as the channel to use for the communicating. The data about the detected NSC that is operating on the channel can further include data describing a median of multiple measurements of the RSRP for the at least one channel in the plurality of channels. The processor can be configured to use the following equation to determine the utility value ($U_n$) for a channel (n) in the plurality of channels:

$$U_n = -(M_n - K_n * \Delta)$$

where:
$M_n$ = the respective modified non-NSC RSSI and the respective modified RSRP for the channel,
$K_n$ = the number of neighboring access point using the channel, and
$\Delta$ = an amount to bias the transmission characteristic measurement for each neighboring access point using the channel.

The apparatus can further include at least one of a mobile device, an access point, a communications device, a personal digital assistant, a fixed location data unit, a computer, or a combination thereof, with which the processor is integrated. The processor can be part of an access point, and the choosing can be performed during boot-up of the access point. The processor can be further configured to use a default channel prior to completing the choosing.

At least a part of the apparatus can be integrated on a semiconductor die. In a further example, provided is a non-transitory computer-readable medium, having at least one instruction stored thereon that, if executed by a lithographic device, cause the lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed examples can be readily utilized as a basis for modifying or designing other structures for carrying out the same purposes of the present teachings. Such equivalent constructions do not depart from the technology of the teachings as set forth in the claims. The inventive features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

Figure 1:
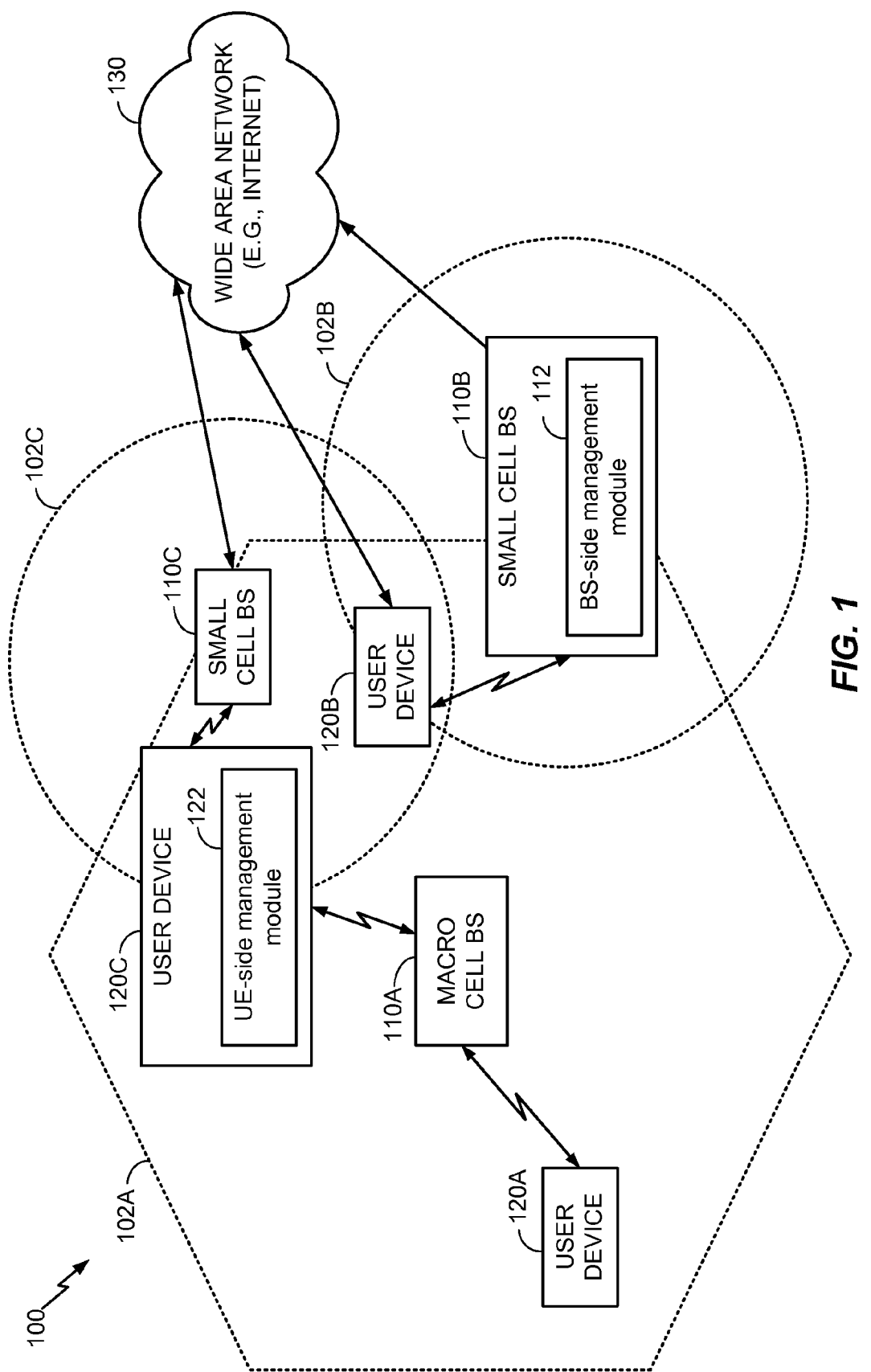
FIG. 1 depicts an example mixed-deployment wireless communication system including macro cell base stations and small cell base stations.

In accordance with common practice, the features depicted by the drawings cannot be drawn to scale. Accordingly, the dimensions of the depicted features can be arbitrarily expanded or reduced for clarity. In accordance with common practice, some of the drawings are simplified for clarity. Thus, the drawings cannot depict all components of a particular apparatus or method. Further, like reference numerals denote like features throughout the specification and figures.

DETAILED DESCRIPTION

Introduction

Provided are methods and apparatus that select a communication channel based on user equipment (UE)-assisted channel selection with a co-channel operation constraint. In an example, an autonomous channel selection method is provided, so an access point decides on its channel of operation without receiving a channel assignment from a higher-level network management device.

The goals for neighborhood small cell (NSC) channel selection are: (1) selecting the cleanest channel (i.e., the channel with the least non-NSC interference); and (2) trying to keep NSCs operating on the same channel as often as possible, in order to reduce a cost of inter-frequency measurement for mobility and automatic neighbor relation (ANR).

To select a channel from a plurality of channels, the methods and apparatus process UE measurement reports to perform channel selection. The UE measurement reports from either UE ANR or other purposes can help gain better visibility of the surrounding neighboring NSCs as well as better RF sensitivity. The UEs sample multiple locations inside the serving NSC's service area and, depending on the type of UE, may have better sensitivity than the access point.

Statistics are developed from the UE reports and a neighbor relation table (NRT). The access point stores the UE reports, the NRT, and the statistics. Thus, the NRT is built over time using, for example, a network listen function and/or data from UE reports (e.g., automatic neighbor relation data, RSSI measurements from different locations, etc.). Accordingly, the NRT provides knowledge of the surrounding NSCs. The access point can use the statistics the next time the access point boots up and performs channel selection.

The exemplary apparatuses and methods disclosed herein advantageously address the long-felt industry needs, as well as other previously unidentified needs, and mitigate shortcomings of the conventional methods and apparatus. For example, an advantage provided by the disclosed apparatuses and methods herein is an improvement in cost savings, energy savings, and time savings over conventional devices. Other advantages include a reduction in time, energy, and expense of handing off a device accessing the access point and neighboring access points. The exemplary apparatuses and methods disclosed herein also provide benefits stemming from: (1) the NRT is built over time and has a better knowledge of the surrounding neighboring NSCs; and (2) the UE reports can provide measurements of received signal strength (RSSI), reference signal received power (RSRP), and/or reference signal received quality (RSRQ) on multiple channels and at different locations to provide a more complete picture of the non-NSC interference distributions within the serving NSC coverage area. Further, the channel usage distribution data can be used to weigh the measured transmission characteristic in order to achieve a balance of minimizing interference from other neighboring access points and maximizing the number of access points operating on the same channel.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

In this description, certain terminology is used to describe certain features. The term "mobile device" can describe, and is not limited to, a user device, a mobile phone, a mobile communication device, a pager, a personal digital assistant, a personal information manager, a mobile hand-held computer, a laptop computer, a wireless device, a wireless modem, and/or other types of portable electronic devices typically carried by a person and/or having communication capabilities (e.g., wireless, cellular, infrared, short-range radio, etc.). Further, the terms "user equipment" (UE), "mobile terminal," "mobile device," and "wireless device," can be interchangeable.

As used herein, an access point providing coverage over a relatively large area is usually referred to as a macro access point, while an access point that provides coverage over a relatively small area (e.g., a residence) is usually referred to as a small cell access point. Intermediate access points that provide coverage over an area smaller than a macro area but larger than a small cell area are usually referred to as pico access points (e.g., providing coverage within a commercial building). For convenience, the various functions described this disclosure can be scaled for use by any of these types of access points. A cell associated with a macro access point, a small cell access point, or a pico access point can be referred to as a macrocell, a small cell, or a picocell, respectively. In some system implementations, each cell can be further associated with (e.g., divided into) one or more sectors.

In some examples, other terminology can be used to reference a macro access point, a small cell access point, a pico access point, a user device, and other devices. The use of such terms is generally not intended to invoke or exclude a particular technology in relation to the aspects described or otherwise facilitated by the description herein. For example, a macro access point can be configured or alternatively referred to as a macro node, macro access point, NodeB, evolved NodeB (eNodeB), macrocell, and so on. A small cell access point can be configured or alternatively referred to as a small cell node, small cell access point, Home NodeB, Home eNodeB, femtocell, a access point, and so on. A user device can be configured or alternatively referred to as a device, user equipment (UE), subscriber unit, subscriber station, mobile station, mobile device, access terminal, and so on. For convenience, this disclosure described various functions in the context of generic "access points" and "access devices," which, unless otherwise indicated by the particular context of the description, are intended to cover the corresponding technology and terminology in all wireless systems.

DESCRIPTION OF THE FIGURES

FIG. 1 depicts an example mixed-deployment wireless communication system, in which small cell base stations are deployed in conjunction with and to supplement the coverage of macro cell base stations. As used herein, small cells generally refer to a class of low-powered base stations that may include or be otherwise referred to as femto cells, pico cells, micro cells, etc. As noted in the background above, they may be deployed to provide improved signaling, incremental capacity growth, richer user experience, and so on.

The depicted wireless communication system 100 is a multiple-access system that is divided into a plurality of cells 102 and configured to support communication for a number of users. Communication coverage in each of the cells 102 is provided by a corresponding base station 110, which interacts with one or more user devices 120 via DownLink (DL) and/or UpLink (UL) connections. In general, the DL corresponds to communication from a base station to a user device, while the UL corresponds to communication from a user device to a base station.

As will be described in more detail below, these different entities may be variously configured in accordance with the teachings herein to provide or otherwise support the features discussed briefly above. For example, one or more of the small cell base stations 110 may include a BS-side management module 112, while one or more of the user devices 120 may include a UE-side management module 122.

As used herein, the terms "user device" and "base station" are not intended to be specific or otherwise limited to any particular Radio Access Technology (RAT), unless otherwise noted. In general, such user devices may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station may operate according to one of several RATs in communication with user devices depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A is configured to provide communication coverage within a macro cell coverage area 102A, which may cover a few blocks within a neighborhood or several square miles in a rural environment. Meanwhile, the small cell base stations 110B, 110C are configured to provide communication coverage within respective small cell coverage areas 102B, 102C, with varying degrees of overlap existing among the different coverage areas. In some systems, each cell may be further divided into one or more sectors (not shown).

Turning to the depicted connections in more detail, the user device 120A may transmit and receive messages via a wireless link with the macro cell base station 110A, the message including information related to various types of communication (e.g., voice, data, multimedia services, associated control signaling, etc.). The user device 120B may similarly communicate with the small cell base station 110B via another wireless link, and the user device 120C may similarly communicate with the small cell base station 110C via another wireless link. In addition, in some scenarios, the user device 120C, for example, may also communicate with the macro cell base station 110A via a separate wireless link in addition to the wireless link it maintains with the small cell base station 110C.

As is further depicted in FIG. 1, the macro cell base station 110A may communicate with a corresponding wide area or external network 130, via a wired link or via a wireless link, while the small cell base stations 110B, 110C may also similarly communicate with the network 130, via their own wired or wireless links. For example, the small cell base stations 110B, 110C may communicate with the network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the network 130 includes network variations such as the public Internet, a private network within the Internet, a secure network within the Internet, a private network, a public network, a value-added network, an intranet, and the like. In certain systems, the network 130 may also comprise a Virtual Private Network (VPN).

Accordingly, it will be appreciated that the macro cell base station 110A and/or either or both of the small cell base stations 110B, 110C may be connected to the network 130 using any of a multitude of devices or methods. These connections may be referred to as the "backbone" or the "backhaul" of the network, and may in some implementations be used to manage and coordinate communications between the macro cell base station 110A, the small cell base station 110B, and/or the small cell base station 110C. In this way, as a user device moves through such a mixed communication network environment that provides both macro cell and small cell coverage, the user device may be served in certain locations by macro cell base stations, at other locations by small cell base stations, and, in some scenarios, by both macro cell and small cell base stations.

For their wireless air interfaces, each base station 110 may operate according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

Figure 2:
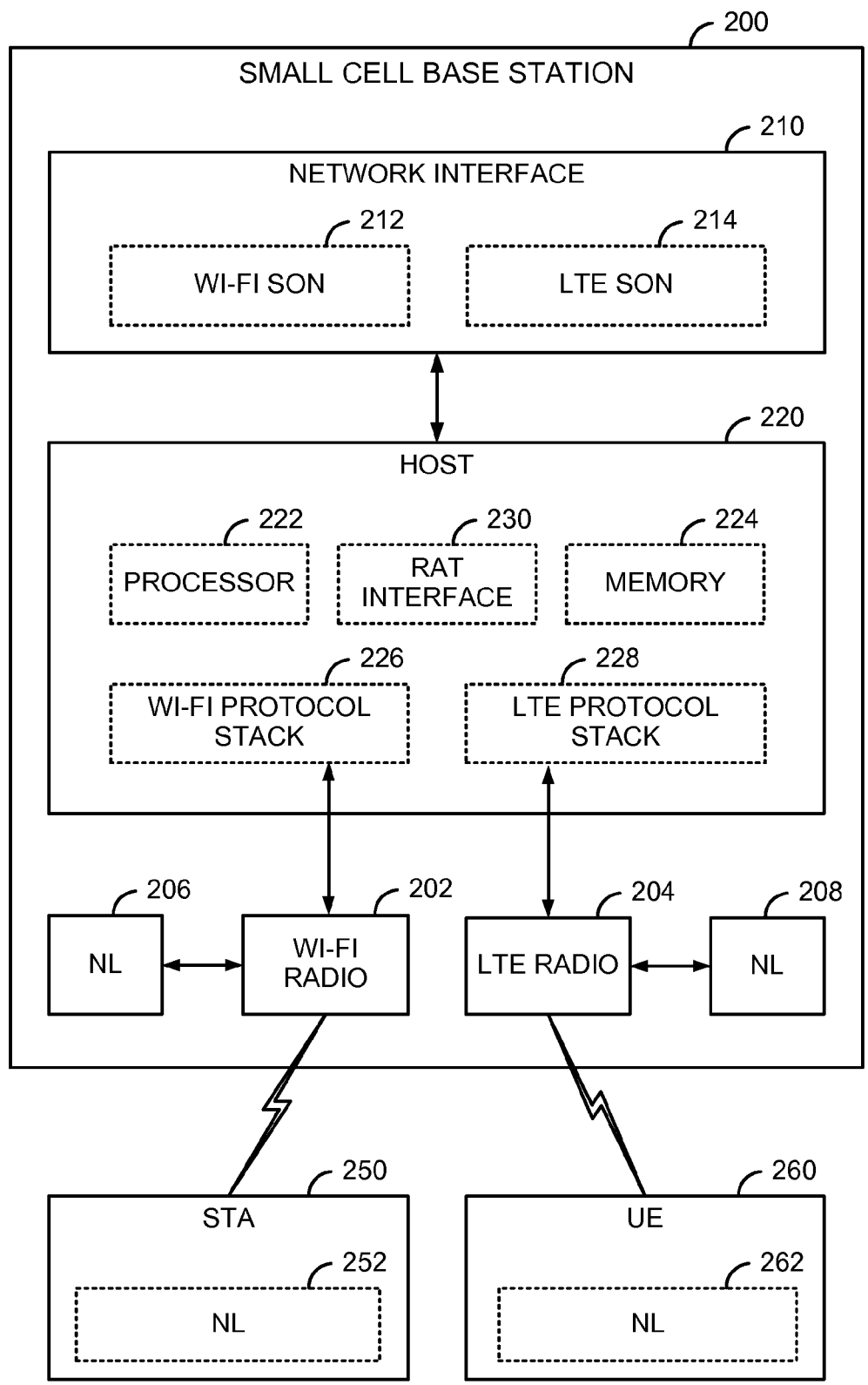
FIG. 2 depicts an example small cell base station with co-located radio components (e.g., LTE and Wi-Fi).

FIG. 2 depicts an example small cell base station with co-located radio components. The small cell base station 200 may correspond, for example, to one of the small cell base stations 110B, 110C depicted in FIG. 1. In this example, the small cell base station 200 is configured to provide a Wireless Local Area Network (WLAN) air interface (e.g., in accordance with an IEEE 802.11x protocol) in addition to a cellular air interface (e.g., in accordance with an LTE protocol). For illustration purposes, the small cell base station 200 is shown as including an 802.11x radio component/module (e.g., transceiver) 202 co-located with an LTE radio component/module (e.g., transceiver) 204.

As used herein, the term co-located (e.g., radios, base stations, transceivers, etc.) may include in accordance with various aspects, one or more of, for example: components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

Returning to FIG. 2, the Wi-Fi radio 202 and the LTE radio 204 may perform monitoring of one or more channels (e.g., on a corresponding carrier frequency) to perform various corresponding operating channel or environment measurements (e.g., CQI, RSSI, RSRP, or other RLM measurements) using corresponding Network/Neighbor Listen (NL) modules 206 and 208, respectively, or any other suitable component(s).

The small cell base station 200 may communicate with one or more user devices via the Wi-Fi radio 202 and the LTE radio 204, depicted as an STA 250 and a UE 260, respectively. Similar to the Wi-Fi radio 202 and the LTE radio 204, the STA 250 includes a corresponding NL module 252 and the UE 260 includes a corresponding NL module 262 for performing various operating channel or environment measurements, either independently or under the direction of the Wi-Fi radio 202 and the LTE radio 204, respectively. In this regard, the measurements may be retained at the STA 250 and/or the UE 260, or reported to the Wi-Fi radio 202 and the LTE radio 204, respectively, with or without any pre-processing being performed by the STA 250 or the UE 260.

While FIG. 2 shows a single STA 250 and a single UE 260 for illustration purposes, it will be appreciated that the small cell base station 200 can communicate with multiple STAs and/or UEs. Additionally, while FIG. 2 depicts one type of user device communicating with the small cell base station 200 via the Wi-Fi radio 202 (i.e., the STA 250) and another type of user device communicating with the small cell base station 200 via the LTE radio 204 (i.e., the UE 260), it will be appreciated that a single user device (e.g., a smartphone) may be capable of communicating with the small cell base station 200 via both the Wi-Fi radio 202 and the LTE radio 204, either simultaneously or at different times.

As is further depicted in FIG. 2, the small cell base station 200 may also include a network interface 210, which may include various components for interfacing with corresponding network entities (e.g., Self-Organizing Network (SON) nodes), such as a component for interfacing with a Wi-Fi SON 212 and/or a component for interfacing with an LTE SON 214. The small cell base station 200 may also include a host 220, which may include one or more general purpose controllers or processors 222 and memory 224 configured to store related data and/or instructions. The host 220 may perform processing in accordance with the appropriate RAT(s) used for communication (e.g., via a Wi-Fi protocol stack 226 and/or an LTE protocol stack 228), as well as other functions for the small cell base station 200. In particular, the host 220 may further include a RAT interface 230 (e.g., a bus or the like) that enables the radios 202 and 204 to communicate with one another via various message exchanges.

Figure 3:
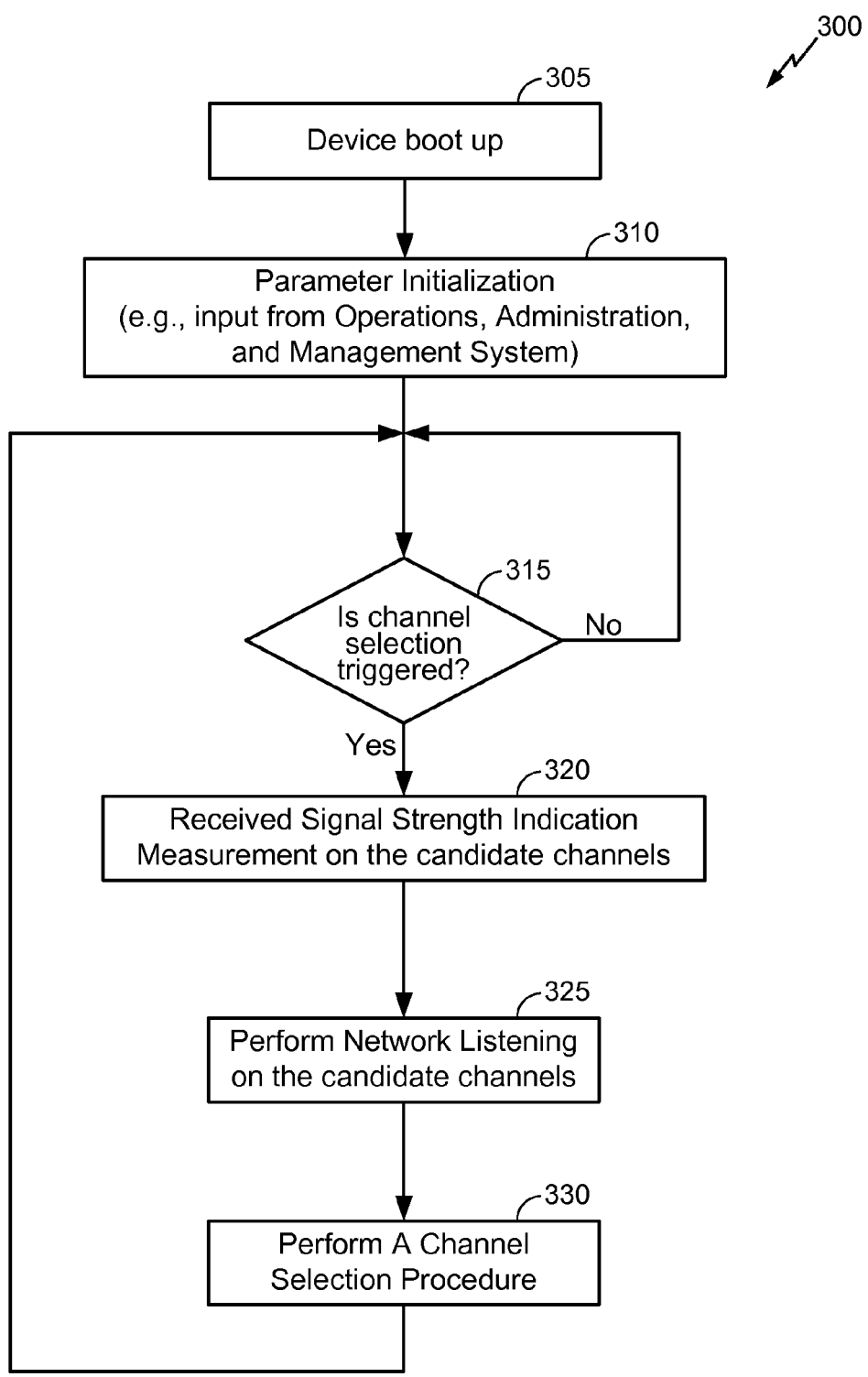
FIG. 3 depicts an exemplary method for channel selection.

FIG. 3 depicts an exemplary method for channel selection 300. In an example, an objective is to strike a balance between selecting the cleanest channel (i.e., the channel with the least interference) and keeping access points operating on the same channel as often as possible, in order to reduce the cost of inter-frequency measurement. Thus, a distributed solution is provided, with minimum operations, administration, and maintenance device (OAM) interactions. Accordingly, an access point receives an input from the OAM device and runs a channel selection algorithm (e.g., an algorithm described herein) autonomously. A list of candidate channels can be received from the OAM device. The list may or may not be the same for each individual access point. In an example, candidate channels might have non-LTE interference, but no LTE macrocells or picocells, to ensure received signal strength indication (RSSI) is a good indicator of the channel "cleanness." If at least one of LTE macro cells or pico cells are present, then the LTE macro cells' contribution to the RSSI, and the pico cells' contribution to the RSSI, should be removed from the RSSI. For the n-th channel, n=1, . . . , N, the access point performs these operations.

In block 305, the device (e.g., a neighborhood small cell) boots up. Channel selection is performed, and can also be performed with NLM. The channel selection can use at least one of the following inputs: (1) RSSI measurements associated with a candidate channel; or (2) Network Listen results on a candidate channel, such as from a neighboring access point that is discovered. In addition to using the RSSI measurement for channel selection, the Network Listen process can obtain channel usage distribution of other access points surrounding the current access point, and use the channel usage distribution of the other access points to weigh the RSSI measurement.

In block 310, parameters are initialized, and a list of candidate channels (N) is received (e.g., from the OAM device). Other optional parameters can also be received from the OAM device (e.g., a priority of a specific channel).

In block 315, it is determined if channel selection is triggered. For example, an OAM device can trigger channel selection. If channel selection is not triggered, then block 315 repeats. If channel selection is triggered, then the method for channel selection 300 proceeds to block 320.

In block 320, an RSSI measurement is made on a candidate channel. Multiple measurements can be taken per candidate channel. The measurements can be separated in time to overcome channel coherence. For example, an accurate RSSI measurement of a specific channel n is obtained ($RSSI_n$). This can be done, for example, by performing a total of M instantaneous RSSI measurements: $RSSI_n(k)$, k=1, . . . , M, separated by time duration T so that $RSSI_n(k)$ and $RSSI_n(k+1)$ can be considered independent. Then $RSSI_n = \sum_{k=1}^{M} RSSI_n(k)/M$ in the linear domain. The RSSI measurement can be either wideband or narrowband, and the measurement and post-processing can remove contributions from the other neighboring access points, if any are present in the initial RSSI measurement.

In block 325, network listening (NL) techniques are performed on candidate channels from the neighboring access points. For example, NL is performed and an access point on channel n is acquired. The number of neighboring access points acquired is denoted as $K_n$. Other methods can be used to determine $K_n$. For example, for LTE access points, at least one of an RSSI or an RSRP threshold can be enforced during the acquisition process so that only "strong" neighboring access points are counted as $K_n$.

In block 330, channel selection is performed. For example, the access point applies a utility function $f(RSSI, K)$ on the n-th channel, n=1, . . . , N, and denotes the resulting utility as $f_n = f(RSSI_n, K_n)$. The choice of utility function $f(RSSI, K)$ can be any function that satisfies the following constraints:

$f(RSSI, K)$ is a decreasing function of RSSI, i.e., if $RSSI_1 > RSSI_2$, then $f(RSSI_1, K) < f(RSSI_1, K)$, $\forall k$. This implies that channels with higher interference (hence higher RSSI) will have lower utility.

$f(RSSI, K)$ is an increasing function of K, i.e., if $K_1 > K_2$, then $f(RSSI, K_1) > f(RSSI, K_2)$, $\forall RSSI$. This implies that channels with more access points will have higher utility.

An exemplary utility function $f(RSSI, K)$ is: $f(RSSI, K) = -(RSSI - K \times \Delta)$, where RSSI and $\Delta$ are both in dB value, and $\Delta$ is a configurable parameter. The access point compares $f(RSSI, K)$ for all of the N channels and selects the channel that has the highest utility as the channel selection outcome.

In this example, the total number of acquired neighboring small cells $K_n$ is used as an input to the channel selection algorithm. More refined NL results can also be fed into the channel selection algorithm for variants of the proposed channel selection algorithm. For example, in addition to K, one can also feed the measurement result for each cell, for example, ($RSRP_1, RSRP_2, \ldots, RSRP_K$).

Following block 330, the method for channel selection 300 proceeds to block 315.

The blocks in FIG. 3 can be performed by respective modules for performing the respective blocks, where the respective modules are coupled together to form an apparatus.

Figure 4:
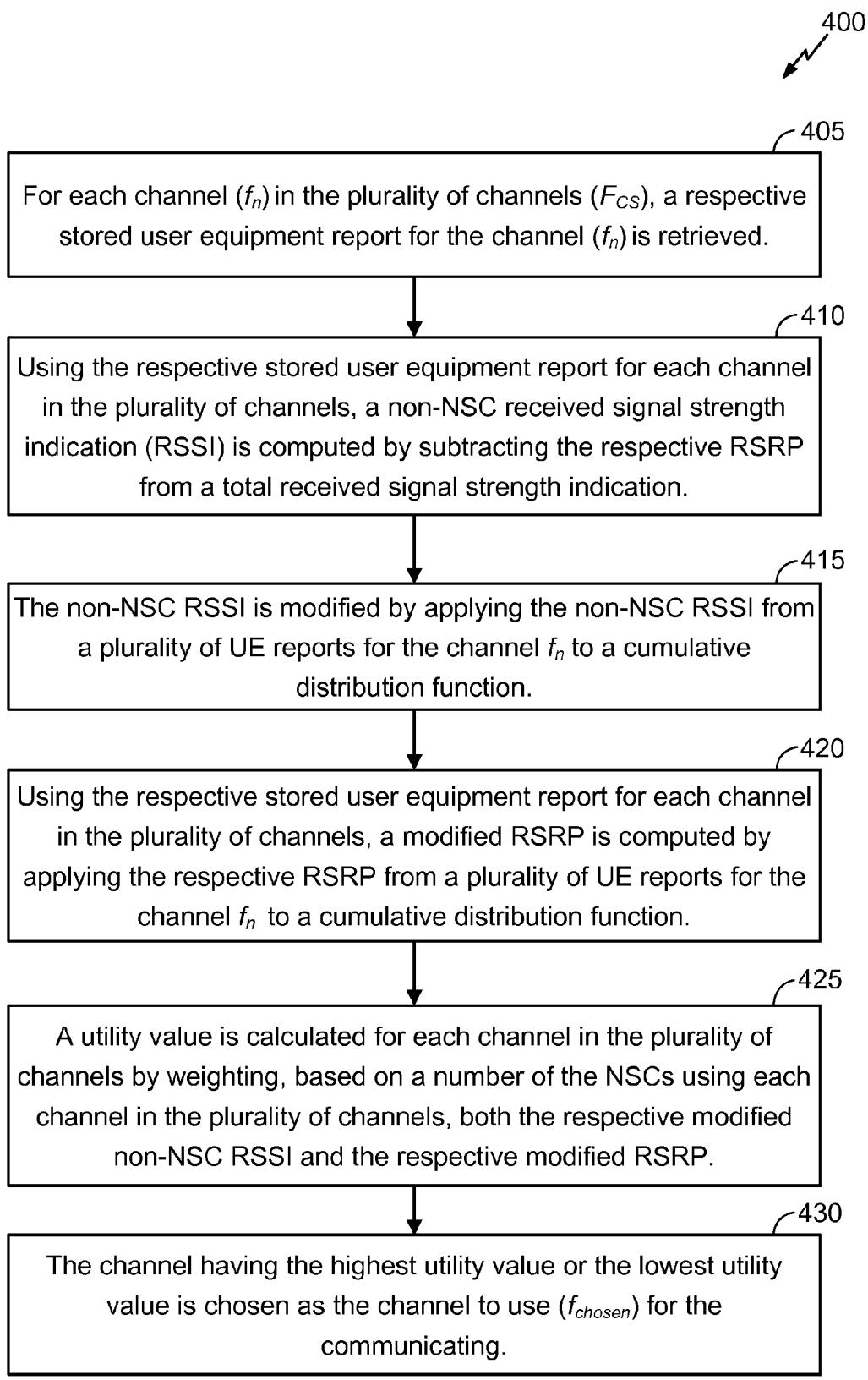
FIG. 4 depicts another exemplary method for channel selection.

FIG. 4 depicts an exemplary method for channel selection 400. The method for channel selection 400 can be performed during device boot-up. Prior to performing the method for channel selection 400, a default chosen channel ($f_{chosen}$) in a plurality of channels (n=1, . . . , N) for channel selection (CS) (e.g., $F_{CS} = \{f_1, \ldots, f_N\}$) can be used for communicating. A channel list for neighbor discovery (ND) can also be used (e.g., $F_{ND} = \{g_1, \ldots, g_M\}$). The UEs can be configured to perform ANR such that the UEs perform neighbor discovery (e.g., identifying PCIs), as well as performing RF measurements (e.g., RSSI, RSRP, and/or RSRQ) on channels in both $F_{CS}$ and $F_{ND}$.

In an example, inputs to the method for channel selection 400 include the candidate channel list ($F_{CS} = \{f_1, \ldots, f_N\}$), as well as a NRT of neighbors discovered on each of $\{f_1, \ldots, f_N\}$ and UE Measurement Reports on each of $\{f_1, \ldots, f_N\}$.

In block 405, for each channel ($f_n$) in the plurality of channels ($F_{CS}$), a respective stored user equipment report for the channel ($f_n$) is retrieved. The respective stored user equipment report for each channel can include data about a detected neighborhood small cell (NSC) that is operating on the channel and a respective reference signal received power (RSRP) from the detected NSC. The user equipment report can include a list of NSCs in a form of a neighbor relation table.

In block 410, using the respective stored user equipment report for each channel in the plurality of channels, a non-NSC received signal strength indication (RSSI) is computed by subtracting the respective RSRP from a total received signal strength indication. For example, for the m-th UE measurement report on $f_n$, compute the non-NSC RSSI by subtracting the RSRP of detected NSCs from the total RSSI. This results in $\{RSSI\_NoNSC_n(m)\}$.

In block 415, the non-NSC RSSI is modified by applying the non-NSC RSSI from a plurality of UE reports for the channel $f_n$ to a cumulative distribution function. For example, then compute NonNSCRSSIPerc % of $\{RSSI\_NoNSC_n(m)\}$ to obtain $RSSI\_NoNSC_n$.

In block 420, using the respective stored user equipment report for each channel in the plurality of channels, a modified RSRP is computed by applying the respective RSRP from a plurality of UE reports for the channel $f_n$ to a cumulative distribution function. For example, assuming that there are $K_n$ neighboring NSCs that have been discovered on $f_n$, compute the NSCRSRPPerc % of {RSRP_NSC$_k$(m)} to obtain RSRP_NSC$_k$, where k=1, ..., Kn.

In block 425, a utility value is calculated for each channel in the plurality of channels by weighting, based on a number of the NSCs using each channel in the plurality of channels, both the respective modified non-NSC RSSI and the respective modified RSRP. An exemplary utility function is U(RSSI_NoNSC$_n$, RSRP_NSC$_1$, ..., RSRP_NSC$_{Kn}$, $K_n$), where the resulting utility is $U_n$.

In an example, the highest utility value or the lowest utility value is based on a channel having the most number of discovered neighbors in the NRT when compared to the other channels in the channel selection list.

In block 430, the channel having the highest utility value or the lowest utility value is chosen as the channel to use ($f_{chosen}$) for the communicating. For example, an NSC access point compares $U_n$ for all the N channels and selects the channel that has the highest utility as the channel selection result.

The blocks in FIG. 4 can be performed by respective modules for performing the respective blocks, where the respective modules are coupled together to form an apparatus.

Figure 5:
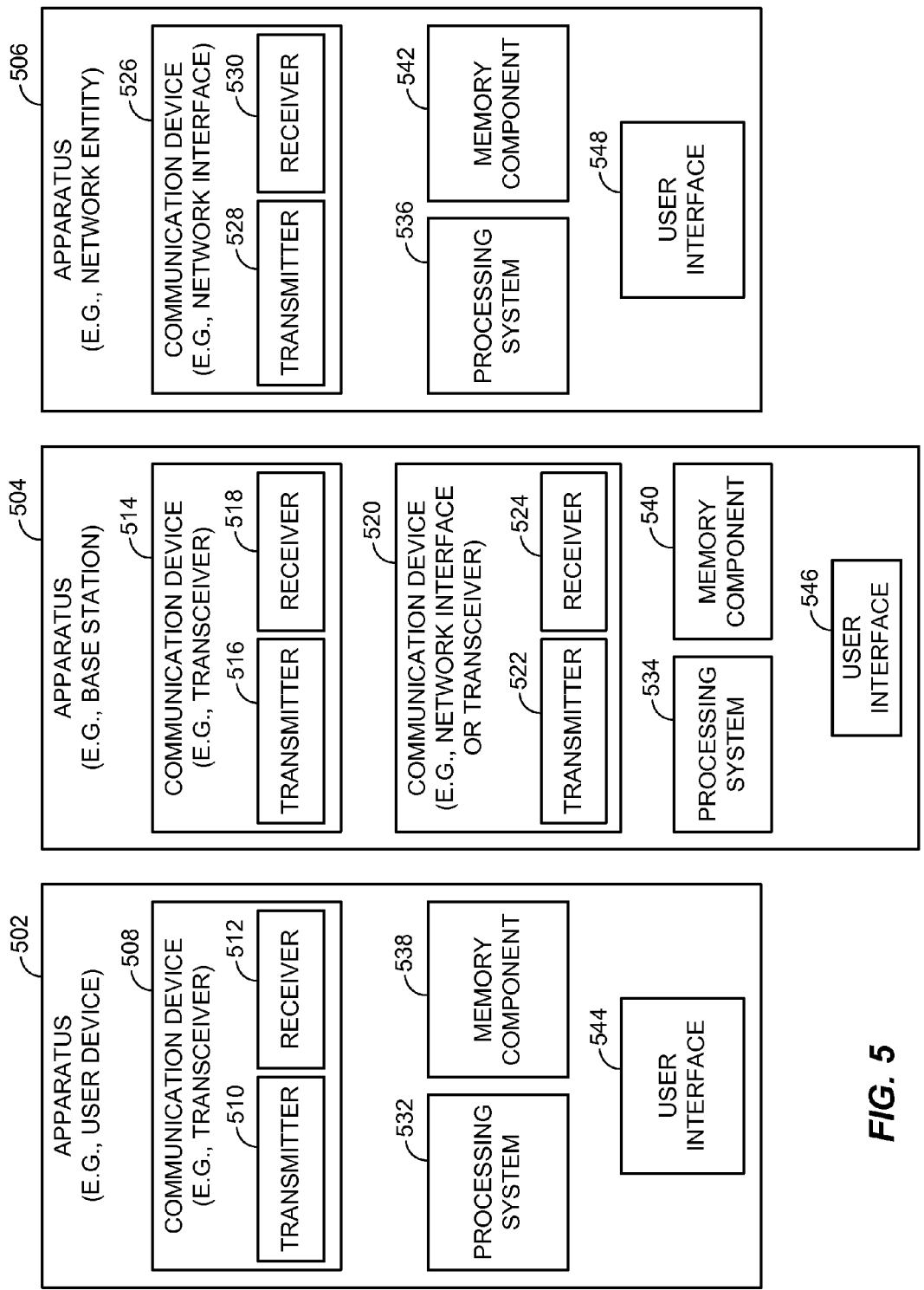
FIG. 5 is a simplified block diagram of several sample aspects of components that may be employed in communication nodes and configured to support communication as taught herein.

FIG. 5 depicts several sample components (represented by corresponding blocks) that may be incorporated into an apparatus 502, an apparatus 504, and an apparatus 506 (corresponding to, for example, a user device, a base station, and a network entity, respectively) to support the operations as taught herein. It will be appreciated that these components may be implemented in different types of apparatuses in different implementations (e.g., in an ASIC, in a SoC, etc.). The depicted components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 502 and the apparatus 504 each include at least one wireless communication device (represented by the communication devices 508 and 514 (and the communication device 520 if the apparatus 504 is a relay)) for communicating with other nodes via at least one designated RAT. Each communication device 508 includes at least one transmitter (represented by the transmitter 510) for transmitting and encoding signals (e.g., messages, indications, information, and so on) and at least one receiver (represented by the receiver 512) for receiving and decoding signals (e.g., messages, indications, information, pilots, and so on). Similarly, each communication device 514 includes at least one transmitter (represented by the transmitter 516) for transmitting signals (e.g., messages, indications, information, pilots, and so on) and at least one receiver (represented by the receiver 518) for receiving signals (e.g., messages, indications, information, and so on). If the apparatus 504 is a relay station, each communication device 520 may include at least one transmitter (represented by the transmitter 522) for transmitting signals (e.g., messages, indications, information, pilots, and so on) and at least one receiver (represented by the receiver 524) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 504 may also comprise a Network Listen Module (NLM) or the like for performing various measurements.

The apparatus 506 (and the apparatus 504 if it is not a relay station) includes at least one communication device (represented by the communication device 526 and, optionally, 520) for communicating with other nodes. For example, the communication device 526 may comprise a network interface that is configured to communicate with one or more network entities via a wire-based or wireless backhaul. In some aspects, the communication device 526 may be implemented as a transceiver configured to support wire-based or wireless signal communication. This communication may involve, for example, sending and receiving: messages, parameters, or other types of information. Accordingly, in the example of FIG. 5, the communication device 526 is shown as comprising a transmitter 528 and a receiver 530. Similarly, if the apparatus 504 is not a relay station, the communication device 520 may comprise a network interface that is configured to communicate with one or more network entities via a wire-based or wireless backhaul. As with the communication device 526, the communication device 520 is shown as comprising a transmitter 522 and a receiver 524.

The apparatuses 502, 504, and 506 also include other components that may be used in conjunction with the operations as taught herein. The apparatus 502 includes a processing system 532 for providing functionality relating to, for example, user device operations to support as taught herein and for providing other processing functionality. The apparatus 504 includes a processing system 534 for providing functionality relating to, for example, base station operations to support as taught herein and for providing other processing functionality. The apparatus 506 includes a processing system 536 for providing functionality relating to, for example, network operations to support as taught herein and for providing other processing functionality. The apparatuses 502, 504, and 506 include memory components 538, 540, and 542 (e.g., each including a memory device), respectively, for maintaining information (e.g., information indicative of reserved resources, thresholds, parameters, and so on). In addition, the apparatuses 502, 504, and 506 include user interface devices 544, 546, and 548, respectively, for providing indications (e.g., audible and/or visual indications) to a user and/or for receiving user input (e.g., upon user actuation of a sensing device such a keypad, a touch screen, a microphone, and so on).

For convenience, the apparatuses 502, 504, and/or 506 are shown in FIG. 5 as including various components that may be configured according to the various examples described herein. It will be appreciated, however, that the depicted blocks may have different functionality in different designs.

The components of FIG. 5 may be implemented in various ways. In some implementations, the components of FIG. 5 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 508, 532, 538, and 544 may be implemented by processor and memory component(s) of the apparatus 502 (e.g., by execution of appropriate code and/or by appropriate configuration of processor components). Similarly, some or all of the functionality represented by blocks 514, 520, 534, 540, and 546 may be implemented by processor and memory component(s) of the apparatus 504 (e.g., by execution of appropriate code and/or by appropriate configuration of processor components). Also, some or all of the functionality represented by blocks 526, 536, 542, and 548 may be implemented by processor and memory component(s) of the apparatus 506 (e.g., by execution of appropriate code and/or by appropriate configuration of processor components).

Figure 6:
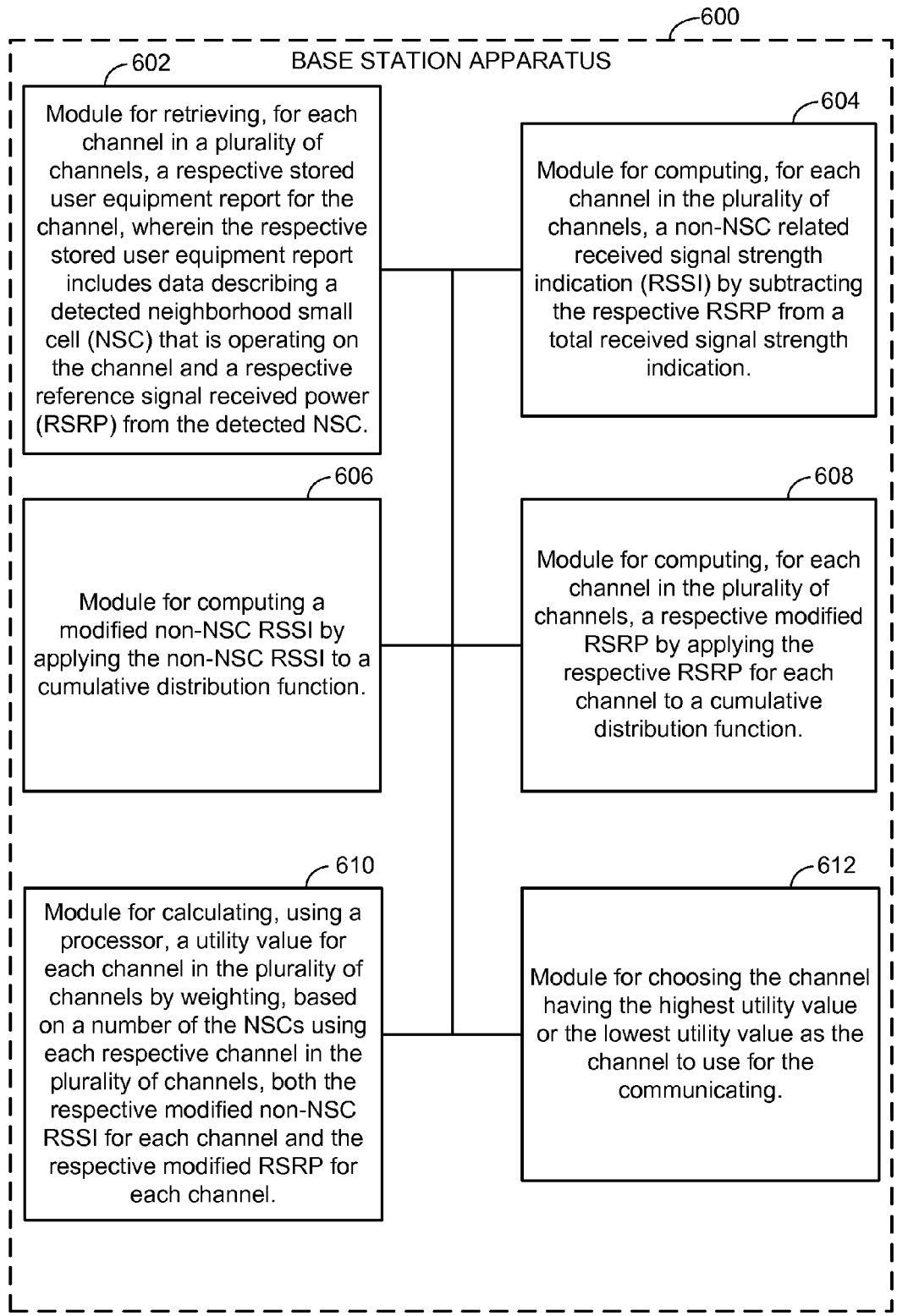
FIGS. 6-7 are other simplified block diagrams of several sample aspects of apparatuses configured to support communication as taught herein.

FIG. 6 depicts an example base station apparatus 600 represented as a series of interrelated functional modules. A module for retrieving, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC 602 may correspond at least in some aspects to, for example, a communication device as discussed herein. A module for computing, for each channel in the plurality of channels, a non-NSC related received signal strength indication (RSSI) by subtracting the respective RSRP from a total received signal strength indication 604 may correspond at least in some aspects to, for example, a processing system as discussed herein. A module for computing a modified non-NSC RSSI by applying the non-NSC RSSI to a cumulative distribution function 606 may correspond at least in some aspects to, for example, a processing system in conjunction with a communication device as discussed herein. A module for computing, for each channel in the plurality of channels, a respective modified RSRP by applying the respective RSRP for each channel to a cumulative distribution function 608 may correspond at least in some aspects to, for example, a processing system in conjunction with a communication device as discussed herein. A module for calculating, using a processor, a utility value for each channel in the plurality of channels by weighting, based on a number of the NSCs using each respective channel in the plurality of channels, both the respective modified non-NSC RSSI for each channel and the respective modified RSRP for each channel 610 may correspond at least in some aspects to, for example, a processing system in conjunction with a communication device as discussed herein. A module for choosing the channel having the highest utility value or the lowest utility value as the channel to use for the communicating 612 may correspond at least in some aspects to, for example, a processing system in conjunction with a communication device as discussed herein.

Figure 7:
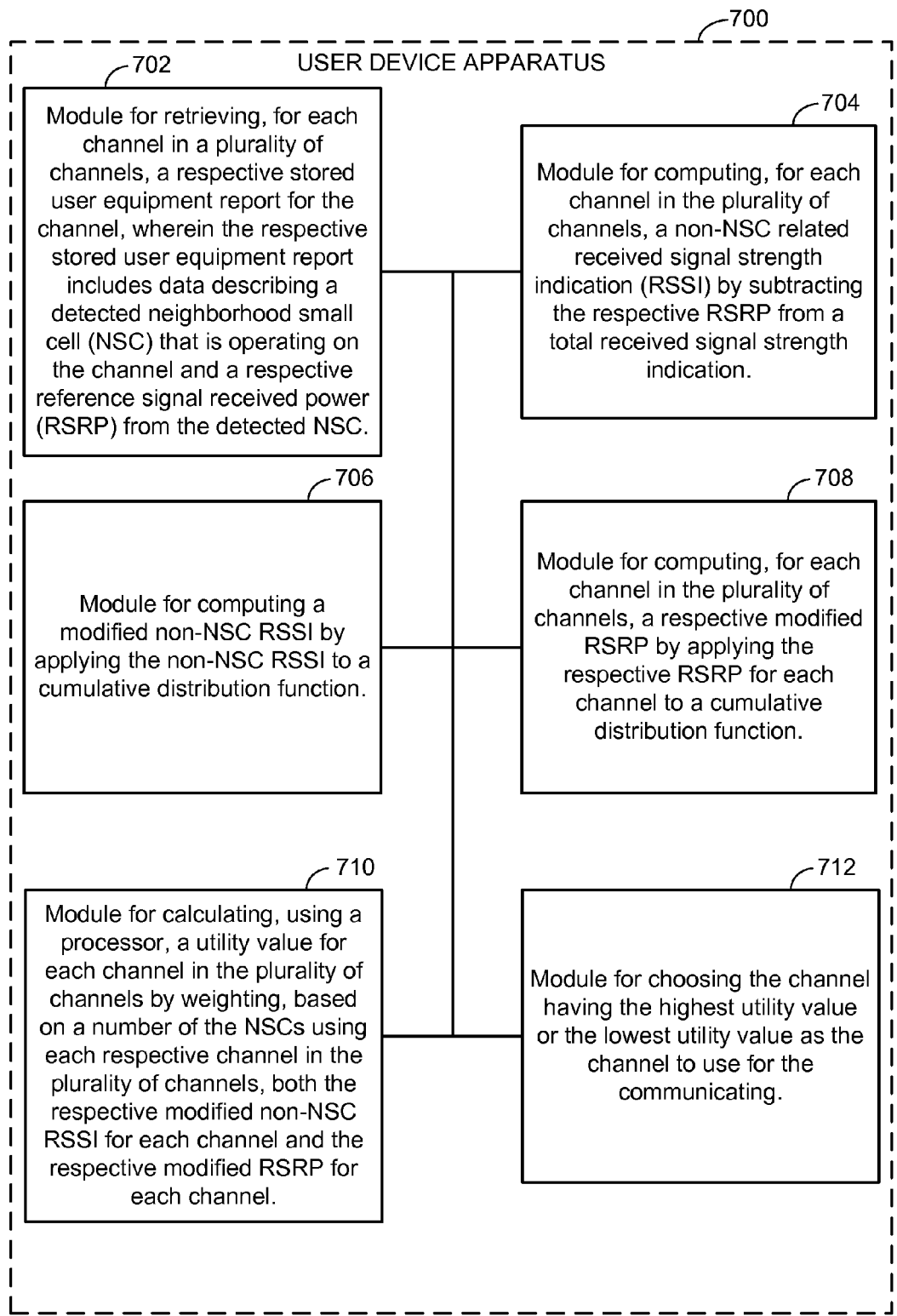

FIG. 7 depicts an example user device apparatus 700 represented as a series of interrelated functional modules. A module for retrieving, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC 702 may correspond at least in some aspects to, for example, a communication device as discussed herein. A module for computing, for each channel in the plurality of channels, a non-NSC related received signal strength indication (RSSI) by subtracting the respective RSRP from a total received signal strength indication 704 may correspond at least in some aspects to, for example, a processing system as discussed herein. A module for computing a modified non-NSC RSSI by applying the non-NSC RSSI to a cumulative distribution function 706 may correspond at least in some aspects to, for example, a processing system in conjunction with a communication device as discussed herein. A module for computing, for each channel in the plurality of channels, a respective modified RSRP by applying the respective RSRP for each channel to a cumulative distribution function 708 may correspond at least in some aspects to, for example, a processing system in conjunction with a communication device as discussed herein. A module for calculating, using a processor, a utility value for each channel in the plurality of channels by weighting, based on a number of the NSCs using each respective channel in the plurality of channels, both the respective modified non-NSC RSSI for each channel and the respective modified RSRP for each channel 710 may correspond at least in some aspects to, for example, a processing system in conjunction with a communication device as discussed herein. A module for choosing the channel having the highest utility value or the lowest utility value as the channel to use for the communicating 712 may correspond at least in some aspects to, for example, a processing system in conjunction with a communication device as discussed herein.

The functionality of the modules of FIGS. 6-7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 6-7, as well as other components and functions described herein, may be implemented using any suitable means. Such means also may be implemented, at least in part, using corresponding structure as taught herein. For example, the components described above in conjunction with the "module for" components of FIGS. 6-7 also may correspond to similarly designated "means for" functionality. Thus, in some aspects one or more of such means may be implemented using one or more of processor components, integrated circuits, or other suitable structure as taught herein.

Figure 8:
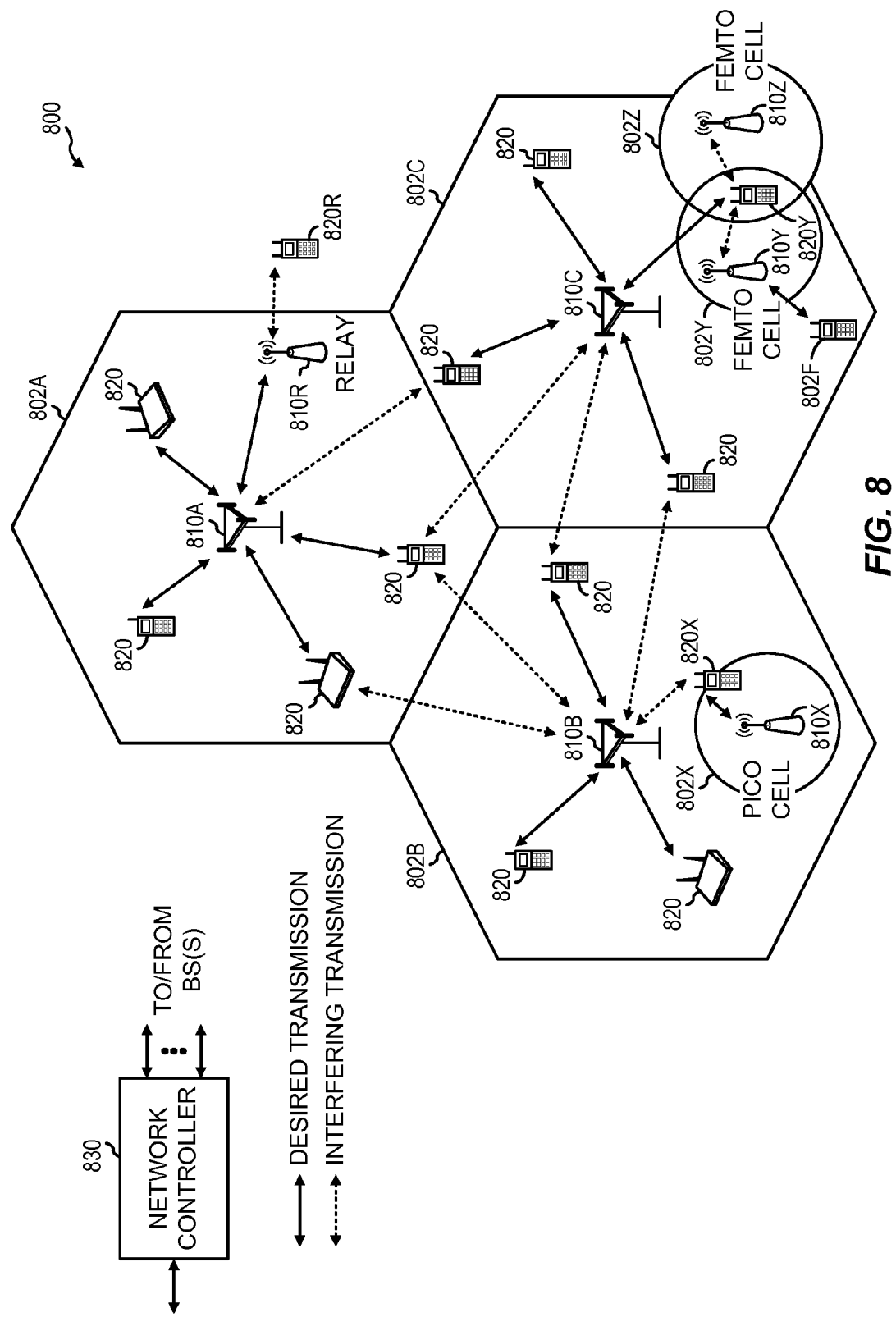
FIG. 8 depicts an example communication system environment in which the teachings and structures herein may be incorporated.

FIG. 8 depicts an example communication system environment in which the teachings and structures herein may be may be incorporated. The wireless communication system 800, which will be described at least in part as an LTE network for illustration purposes, includes a number of eNBs 810 and other network entities. Each of the eNBs 810 provides communication coverage for a particular geographic area, such as macro cell or small cell coverage areas.

In the depicted example, the eNBs 810A, 810B, and 810C are macro cell eNBs for the macro cells 802A, 802B, and 802C, respectively. The macro cells 802A, 802B, and 802C may cover a relatively large geographic area (e.g., several kilometers in radius) and may allow unrestricted access by UEs with service subscription. The eNB 810X is a particular small cell eNB referred to as a pico cell eNB for the pico cell 802X. The pico cell 802X may cover a relatively small geographic area and may allow unrestricted access by UEs with service subscription. The eNBs 810Y and 810Z are particular small cells referred to as femto cell eNBs for the femto cells 802Y and 802Z, respectively. The femto cells 802Y and 802Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless network 800 also includes a relay station 810R. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs (e.g., a mobile hotspot). In the example shown in FIG. 8, the relay station 810R communicates with the eNB 810A and a UE 820R in order to facilitate communication between the eNB 810A and the UE 820R. A relay station may also be referred to as a relay eNB, a relay, etc.

The wireless network 800 is a heterogeneous network in that it includes eNBs of different types, including macro eNBs, pico eNBs, femto eNBs, relays, etc. As discussed in more detail above, these different types of eNBs may have different transmit power levels, different coverage areas, and different impacts on interference in the wireless network 800. For example, macro eNBs may have a relatively high transmit power level whereas pico eNBs, femto eNBs, and relays may have a lower transmit power level (e.g., by a relative margin, such as a 10 dBm difference or more).

Returning to FIG. 8, the wireless network 800 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Unless otherwise noted, the techniques described herein may be used for both synchronous and asynchronous operation.

A network controller 830 may couple to a set of eNBs and provide coordination and control for these eNBs. The network controller 830 may communicate with the eNBs 810 via a backhaul. The eNBs 810 may also communicate with one another, e.g., directly or indirectly via a wireless or wireline backhaul.

As shown, the UEs 820 may be dispersed throughout the wireless network 800, and each UE may be stationary or mobile, corresponding to, for example, a cellular phone, a personal digital assistant, a wireless modem, a wireless communication device, a handheld device, a laptop computer, a cordless phone, a wireless local loop (WLL) station, or other mobile entities. In FIG. 8, a solid line with double arrows indicates desired transmissions between a UE and a serving eNB, which is an eNB designated to serve the UE on the downlink and/or uplink. A dashed line with double arrows indicates potentially interfering transmissions between a UE and an eNB. For example, UE 820Y may be in proximity to femto eNBs 810Y, 810Z. Uplink transmissions from UE 820Y may interfere with femto eNBs 810Y, 810Z. Uplink transmissions from UE 820Y may jam femto eNBs 810Y, 810Z and degrade the quality of reception of other uplink signals to femto eNBs 810Y, 810Z.

Small cell eNBs such as the pico cell eNB 810X and femto eNBs 810Y, 810Z may be configured to support different types of access modes. For example, in an open access mode, a small cell eNB may allow any UE to obtain any type of service via the small cell. In a restricted (or closed) access mode, a small cell may only allow authorized UEs to obtain service via the small cell. For example, a small cell eNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto eNB 810Y may be an open-access femto eNB with no restricted associations to UEs. The femto eNB 810Z may be a higher transmission power eNB initially deployed to provide coverage to an area. Femto eNB 810Z may be deployed to cover a large service area. Meanwhile, femto eNB 810Y may be a lower transmission power eNB deployed later than femto eNB 810Z to provide coverage for a hotspot area (e.g., a sports arena or stadium) for loading traffic from either or both eNB 810C, eNB 810Z.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for selecting a communication channel to use.

While the foregoing disclosure shows various illustrative aspects, it should be noted that various changes and modifications may be made to the depicted examples without departing from the scope defined by the appended claims. The present disclosure is not intended to be limited to the specifically depicted examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for selecting a channel to use for communicating, comprising:
   retrieving, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC;
   computing, for each channel in the plurality of channels, a non-NSC related received signal strength indication (RSSI) by subtracting the respective RSRP from a total received signal strength indication;
   computing, for each channel in the plurality of channels, a respective modified non-NSC RSSI by applying the non-NSC RSSI to a cumulative distribution function;
   computing, for each channel in the plurality of channels, a respective modified RSRP by applying the respective RSRP for each channel in the plurality of channels to a cumulative distribution function;
   calculating, using a processor, a utility value for each channel in the plurality of channels by weighting, based on a number of NSCs using each respective channel in the plurality of channels, both the respective modified non-NSC RSSI for each channel and the respective modified RSRP for each channel; and
   choosing a channel having a highest utility value or a lowest utility value as the channel to use for the communicating.

2. The method of claim 1, wherein the data about the detected NSC that is operating on the channel further comprises data describing a median of multiple measurements of the RSRP for at least one channel in the plurality of channels.

3. The method of claim 1, wherein the calculating the utility value uses the following equation to determine the utility value ($U_n$) for a channel (n) in the plurality of channels:

$$U_n = -(M_n - K_n * \Delta)$$

where:
$M_n$=the respective modified non-NSC RSSI and the respective modified RSRP for the channel,
$K_n$=the number of neighboring access points using the channel, and
$\Delta$=an amount to bias a transmission characteristic measurement for each neighboring access point using the channel.

4. The method of claim 1, wherein the processor is part of an access point, and the choosing is performed during boot-up of the access point.

5. The method of claim 1, further comprising using a default channel prior to completing the choosing.

6. An apparatus configured to select a communication channel to use, comprising:
   a processor configured to:
      retrieve, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC;
      compute, for each channel in the plurality of channels, a non-NSC related received signal strength indication (RSSI) by subtracting the respective RSRP from a total received signal strength indication;
      compute, for each channel in the plurality of channels, a repective modified non-NSC RSSI by applying the non-NSC RSSI to a cumulative distribution function;
      compute, for each channel in the plurality of channels, a respective modified RSRP by applying the respective RSRP for each channel to a cumulative distribution function;
      calculate, using the processor, a utility value for each channel in the plurality of channels by weighting, based on a number of the NSCs using each respective channel in the plurality of channels, both the respective modified non-NSC RSSI for each channel and the respective modified RSRP for each channel; and
      choose a channel having a highest utility value or a lowest utility value as the channel to use for the communicating.

7. The apparatus of claim 6, wherein the data about the detected NSC that is operating on the channel further comprises data describing a median of multiple measurements of the RSRP for at least one channel in the plurality of channels.

8. The apparatus of claim 6, wherein the processor is configured to use the following equation to determine the utility value ($U_n$) for a channel (n) in the plurality of channels:

$$U_n = -(M_n - K_n * \Delta)$$

where:
$M_n$=the respective modified non-NSC RSSI and the respective modified RSRP for the channel,
$K_n$=the number of neighboring access point using the channel, and
$\Delta$=an amount to bias a transmission characteristic measurement for each neighboring access point using the channel.

9. The apparatus of claim 6, further comprising at least one of a mobile device, an access point, a communications device, a personal digital assistant, a fixed location data unit, a computer, or a combination thereof, with which the processor is integrated.

10. The apparatus of claim 6, wherein the processor is part of an access point, and the choosing is performed during boot-up of the access point.

11. The apparatus of claim 6, wherein the processor is further configured to use a default channel prior to completing the choosing.

12. An apparatus configured to select a communication channel to use, comprising:
   means for retrieving, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC;

means for computing, for each channel in the plurality of channels, a non-NSC related received signal strength indication (RSSI) by subtracting the respective RSRP from a total received signal strength indication;

means for computing, for each channel in the plurality of channels, a respective modified non-NSC RSSI by applying the non-NSC RSSI to a cumulative distribution function;

means for computing, for each channel in the plurality of channels, a respective modified RSRP by applying the respective RSRP for each channel to a cumulative distribution function;

means for calculating, using a processor, a utility value for each channel in the plurality of channels by weighting, based on a number of NSCs using each respective channel in the plurality of channels, both the respective modified non-NSC RSSI for each channel and the respective modified RSRP for each channel; and means for choosing a channel having a highest utility value or a lowest utility value as the channel to use for the communicating.

13. The apparatus of claim 12, wherein the data about the detected NSC that is operating on the channel further comprises data describing a median of multiple measurements of the RSRP for at least one channel in the plurality of channels.

14. The apparatus of claim 12, wherein the means for calculating the utility value uses the following equation to determine the utility value ($U_n$) for a channel (n) in the plurality of channels:

$$U_n = -(M_n - K_n * \Delta)$$

where:

$M_n$=the respective modified non-NSC RSSI and the respective modified RSRP for the channel, $K_n$=the number of neighboring access points using the channel, and $\Delta$=an amount to bias a transmission characteristic measurement for each neighboring access point using the channel.

15. The apparatus of claim 12, wherein the means for choosing is part of an access point, and the means for choosing is configured to perform the choosing during boot-up of the access point.

16. The apparatus of claim 12, further comprising means for using a default channel prior to completing the choosing.

17. A non-transitory computer-readable medium, comprising:

processor-executable instructions stored thereon that are configured to cause a processor to execute at least one instruction to perform a method comprising:

retrieving, for each channel in a plurality of channels, a respective stored user equipment report for the channel, wherein the respective stored user equipment report includes data describing a detected neighborhood small cell (NSC) that is operating on the channel and a respective reference signal received power (RSRP) from the detected NSC;

computing, for each channel in the plurality of channels, a non-NSC related received signal strength indication (RSSI) by subtracting the respective RSRP from a total received signal strength indication;

computing, for each channel in the plurality fo channels, a respective modified non-NSC RSSI by applying the non-NSC RSSI to a cumulative distribution function;

computing, for each channel in the plurality of channels, a respective modified RSRP by applying the respective RSRP for each channel to a cumulative distribution function;

calculating, using the processor, a utility value for each channel in the plurality of channels by weighting, based on a number of the NSCs using each respective channel in the plurality of channels, both the respective modified non-NSC RSSI for each channel and the respective modified RSRP for each channel; and choosing a channel having a highest utility value or a lowest utility value as the channel to use for the communicating.

18. The non-transitory computer-readable medium of claim 17, wherein the data about the detected NSC that is operating on the channel further comprises data describing a median of multiple measurements of the RSRP for at least one channel in the plurality of channels.

19. The non-transitory computer-readable medium of claim 17, wherein the calculating the utility value uses the following equation to determine the utility value ($U_n$) for a channel (n) in the plurality of channels:

$$U_n = -(M_n - K_n * \Delta)$$

where:

$M_n$=the respective modified non-NSC RSSI and the respective modified RSRP for the channel, $K_n$=number of neighboring access points using the channel, and $\Delta$=an amount to bias a transmission characteristic measurement for each neighboring access point using the channel.

20. The non-transitory computer-readable medium of claim 17, wherein the method further comprises using a default channel prior to completing the choosing.

* * * * *